United States Patent
Alexander et al.

(10) Patent No.: US 9,880,847 B2
(45) Date of Patent: Jan. 30, 2018

(54) REGISTER FILE MAPPING

(71) Applicant: International Business Machines Corporation, Armonk, NY (US)

(72) Inventors: Gregory W. Alexander, Pflugerville, TX (US); Brian D. Barrick, Pflugerville, TX (US); Lee E. Eisen, Round Rock, TX (US); David A. Schroter, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/751,501

(22) Filed: Jun. 26, 2015

(65) Prior Publication Data

US 2016/0378489 A1    Dec. 29, 2016

(51) Int. Cl.
     *G06F 9/38*      (2006.01)

(52) U.S. Cl.
     CPC .............. *G06F 9/382* (2013.01); *G06F 9/384* (2013.01)

(58) Field of Classification Search
     CPC ................................. G06F 9/382; G06F 9/384
     See application file for complete search history.

(56) References Cited

U.S. PATENT DOCUMENTS

| | | | |
|---|---|---|---|
| 5,519,841 A | 5/1996 | Sager et al. | |
| 6,480,931 B1 | 11/2002 | Buti et al. | |
| 7,769,986 B2 * | 8/2010 | Abernathy | G06F 9/3804 712/217 |
| 7,840,783 B1 * | 11/2010 | Singh | G06F 9/30112 712/217 |
| 7,895,413 B2 * | 2/2011 | Moudgill | G06F 9/3012 712/24 |
| 8,578,136 B2 | 11/2013 | Piry et al. | |
| 2010/0274961 A1 | 10/2010 | Golla et al. | |
| 2013/0339667 A1 | 12/2013 | Alexander et al. | |
| 2014/0122841 A1 | 5/2014 | Abernathy et al. | |
| 2014/0122842 A1 | 5/2014 | Abernathy et al. | |
| 2015/0134935 A1 * | 5/2015 | Blasco | G06F 9/384 712/220 |

OTHER PUBLICATIONS

Kondo et al., "A Small, Fast and Low-Power Register File by Bit-Partitioning," Mar. 2005, Proceedings of the 11th Int'l Symposium on High-Performance Computer Architecture, 10 pages.*

(Continued)

*Primary Examiner* — Yuqing Xiao
(74) *Attorney, Agent, or Firm* — Steven F. McDaniel

(57) ABSTRACT

An apparatus for processing instructions includes a mapping unit comprising a plurality of mappers wherein each mapper of the plurality of mappers maps a logical sub-register reference to a physical sub-register reference, a decoding unit configured to receive an instruction and determine a plurality of logical sub-register references therefrom, and an execution unit. The mapping unit may be configured to distribute the plurality of logical sub-register references amongst the plurality of mappers according to at least one bit in the instruction and provide a corresponding plurality of physical sub-register references. The execution unit may be configured to execute the instruction using the plurality of physical sub-register references. Corresponding methods are also disclosed herein.

17 Claims, 4 Drawing Sheets

(56) References Cited

OTHER PUBLICATIONS

Yang et al., "Compacting register file via 2-level renaming and bit-partitioning," May 2007, J. Microprocessors and Microsystems vol. 31, Issue 3, pp. 178-187.*
D. Sima, "The Design Space of Register Renaming Techniques," Sep. 2000, IEEE MICRO, vol. 20, No. 5, pp. 70-83.*
IBM et al., "IBM Launches z13 Mainframe—Most Powerful and Secure System Ever Built", Jan. 13, 2015, <http://www-03.ibm.com/press/us/en/pressrelease/45808.wss#/release>, "Grace Period Disclosures", pp. 1-5.

* cited by examiner

REGISTER FILE MAPPING

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:
(1) IBM z13 Mainframe, IBM, Jan. 13, 2015
www-03.ibm.com/press/us/en/pressrelease/45808.wss

BACKGROUND OF THE INVENTION

The present invention relates generally to the field of instruction processing and more particularly to mapping logical resources to physical resources in an instruction processing pipeline.

The instruction set architecture of many CPUs references a set of registers which are used to stage data between memory and the functional units on the chip. In simpler CPUs, these architectural registers correspond one-for-one to the entries in a physical register file within the CPU. Some advanced CPUs have a pool of physical registers that are assigned to logical registers on an as-needed basis. Such CPUs may map a logical register identifier to a physical register index via a mapper.

SUMMARY

An apparatus for processing instructions includes a mapping unit comprising a plurality of mappers wherein each mapper of the plurality of mappers maps a logical sub-register reference to a physical sub-register reference, a decoding unit configured to receive an instruction and determine a plurality of logical sub-register references therefrom, and an execution unit. The mapping unit may be configured to distribute the plurality of logical sub-register references amongst the plurality of mappers according to at least one bit in the instruction and provide a corresponding plurality of physical sub-register references. The execution unit may be configured to execute the instruction using the plurality of physical sub-register references. Corresponding methods are also disclosed herein.

DETAILED DESCRIPTION

Register mapping is a technique that converts a logical register reference to one or more physical register references. In many processing systems, some addressing modes and/or instructions may not use the entire data width of a CPU. Consequently, multiple register files (referred to herein as sub-register files) that are a fraction of the CPU width (e.g., 32 bits instead of 64 bits) may be used to enable complete utilization of the register memory array. When accessing larger data types, multiple sub-register files may be accessed in parallel to provide data that spans the complete CPU data width.

Each sub-register file may have a mapper associated therewith. In systems where a mapper is used, the use of shorter data types may result in reduced access to one or more mappers. Consequently, the use of shorter data types often results in inefficient utilization of mapping resources.

Figure 1A:
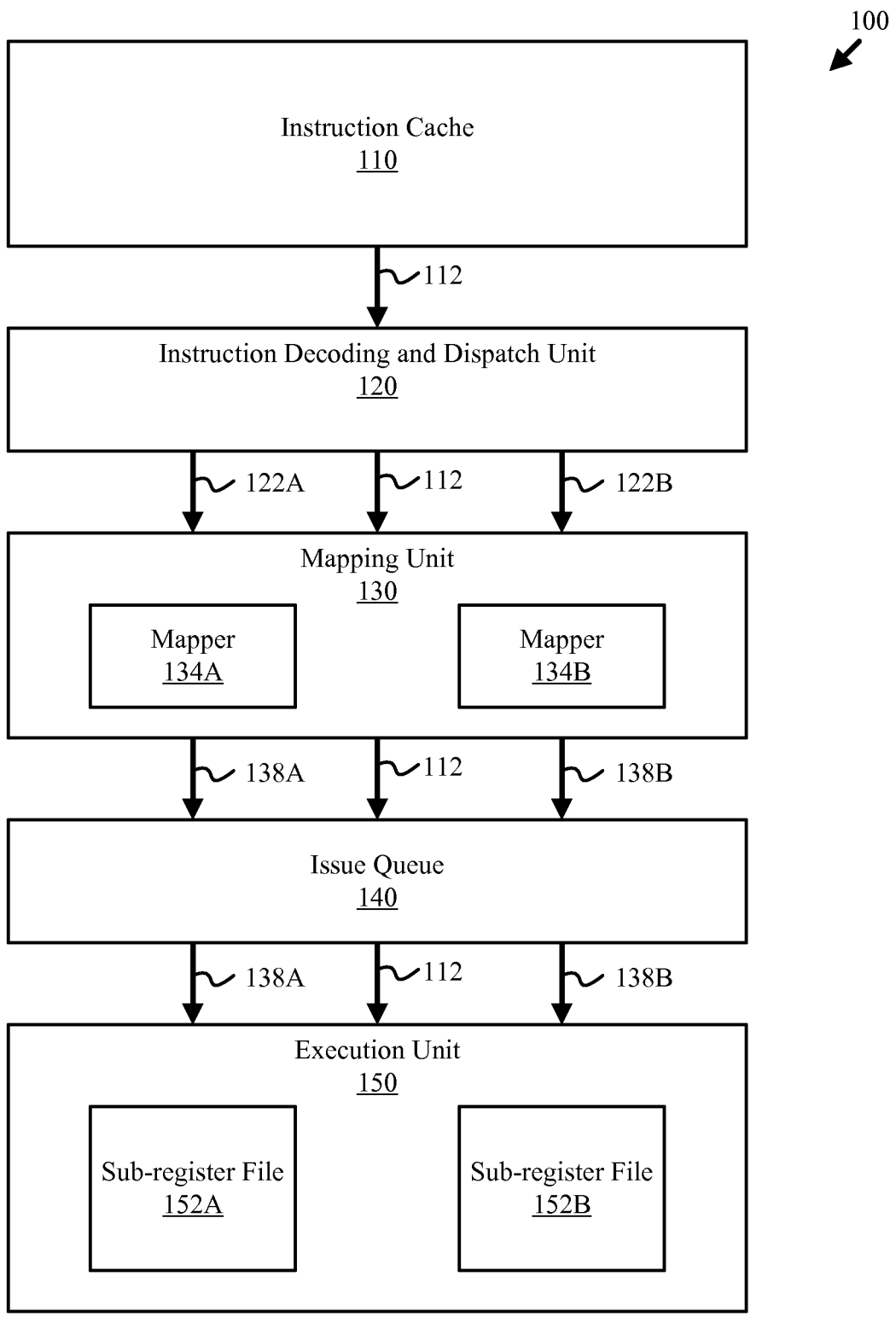
FIGS. 1A and 1B are block diagrams depicting selected portions of one example of an instruction processing system in accordance with at least one embodiment of the present invention.
Figure 1B:
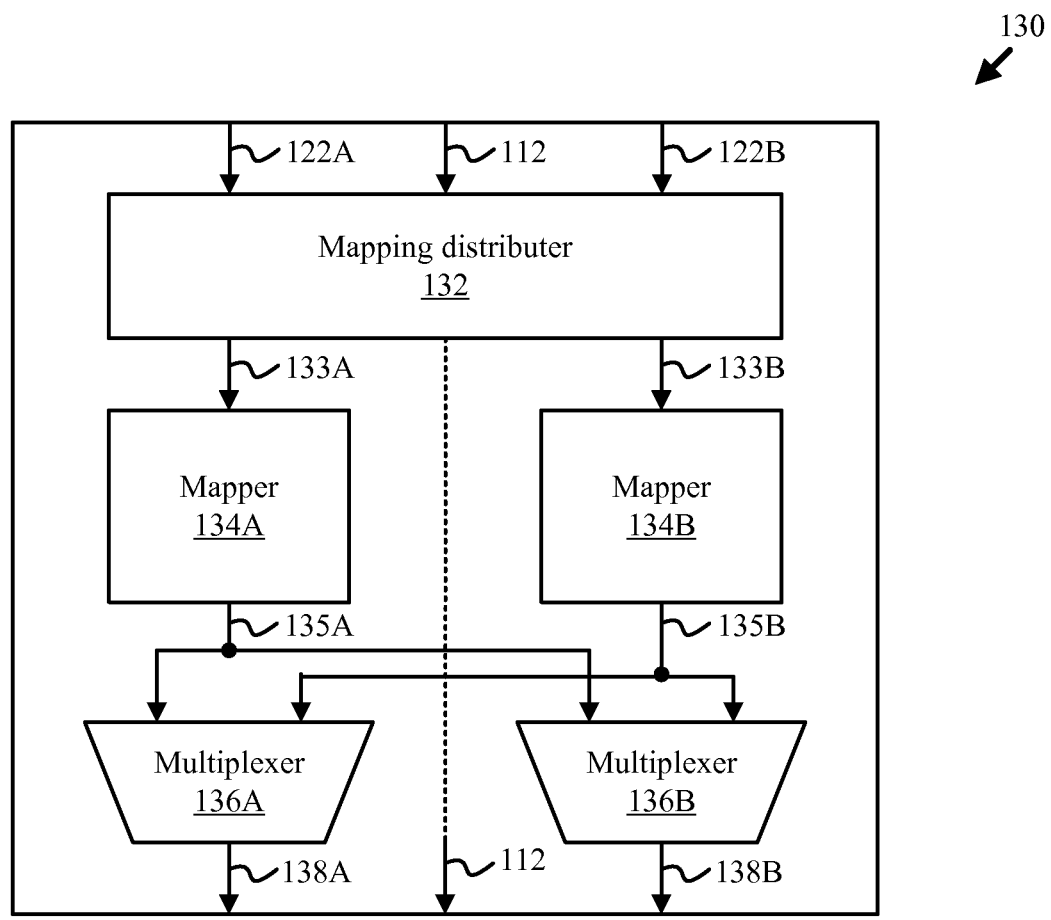

The embodiments disclosed here mitigate underutilization of mapping resources. For example, FIGS. 1A and 1B are block diagrams depicting selected portions of one example of an instruction processing system 100 in accordance with at least one embodiment of the present invention. As depicted, the instruction processing system 100 includes an instruction cache 110, an instruction decoding and dispatch unit 120, a mapping unit 130, an issue queue 140, and an execution unit 150. The instruction processing system 100 may include other elements needed for executing computer instructions that are omitted for the sake of simplicity. Furthermore, the complexity of the depicted elements is generally omitted for the sake of simplicity.

The instruction cache 110 stores processing instructions 112 that can be executed by the instruction processing system 100. In some embodiments, the instruction cache 110 stores one or more cache lines. One or more program counters (not shown) may provide an address to the instruction cache 110 indicting the current index of an executed program within memory. In response thereto, the instruction cache 110 may immediately, or after retrieving a page or line of instructions from main memory, provide an instruction 112 to the instruction decoding and dispatch unit 120.

The instruction decoding and dispatch unit 120 may parse the instruction 112 and determine one or more logical register references that indicate one or more logical registers that are operands of the instruction 112. For example, the instruction 112 may indicate a source register and one or more target registers that are referenced (i.e., used) by the instruction 112. In one embodiment, the decoding and dispatch unit 120 decodes a portion of the instruction into a logical register type and a logical register number (i.e., logical register reference). For the sake of simplicity, the following description will generally assume a single logical register reference is included with each instruction 112. In response to determining a logical register reference, the instruction decoding and dispatch unit 120 may determine multiple logical sub-register references 122 (e.g., 122A and 122B) that correspond to a particular logical register reference.

The mapping unit 130 may receive the logical sub-register references 122 and map the logical sub-register references to physical sub-register references 138 (e.g., 138A and 138B) via one or more mappers 134 (e.g., 134A and 134B). In one embodiment, the mapping unit 130 distributes the logical sub-register references 138 amongst the mappers 134 according to a hashing of one or more bits of the logical register type and/or the logical register number. Subsequently, the issue queue 140 may queue the instruction 112 as well as the physical sub-register references 138, and provide them as needed to the execution unit 150. The execution unit 150 may execute the instruction 112 and operate on the particular sub-registers 152 (e.g., 152A and 152b) indicated by the physical sub-register references 138.

Referring now to FIG. 1B, the mapping unit 130 may include one or more mappers 134 (e.g., 134A and 134B) that map logical sub-register references 133 (e.g., 133A and 133B) to physical sub-register references 135 (e.g., 135A and 135B). In the depicted embodiment, the mappers 134A and 134B are memory arrays that store a physical sub-register reference 135 at a memory location corresponding the logical sub-register reference 133. Consequently, the logical sub-register references 122A and 122B may be used as an address for the memory array used as the mappers 134A and 134B respectively.

In order to balance the mapping that occurs within the mappers, particularly for certain instructions and addressing modes, a mapping distributor 132 may distribute the received logical sub-register references 122 to the mappers 134. The distribution pattern used by the mapping distributer 132 may be determined by one or more bits, or the hashing of various bits, of the instruction 112. In the depicted embodiment, the logical sub-register references 122 may be passed straight through or juxtaposed (referred to herein as flipped) by the mapping distributer 132 and provided as the logical sub-register references 133.

In some embodiments, whether the logical sub-register references 122 are passed straight through or reordered is determined by a selected low order bit of the logical sub-register reference 122A. When passed through, the depicted logical sub-register references 122A and 122B are provided as the logical sub-register references 133A and 133B respectively. When flipped, the depicted logical sub-register references 122A and 122B are provided as the logical sub-register references 133B and 133A, respectively.

Although the depicted embodiment shows two mappers 134 and distribution is limited to flipping (or not flipping) the sub-register references, more than two mappers may be used with a variety of distribution patterns. The selected distribution pattern used by the mapping distributer 132 may balance the mapping load on, and usage of, the mappers 134. The distribution pattern used by the mapping distributer 132 may also vary according to the instruction type or addressing mode of the instruction in order to effectively balance the load on the mappers 134.

The multiplexers 136 may be configured to reverse the distribution pattern provided by the mapping distributer 132 in order to maintain the proper relationship between the logical sub-register references 122 and the physical sub-register references 138. For example, in the depicted embodiment, the multiplexers 136 may 'un-flip' or 'un-distribute' the physical sub-register references 135 (e.g., 135A and 135B) in order to reverse any 'flipping' or 'distributing' done by the mapping distributer 132.

Figure 2:
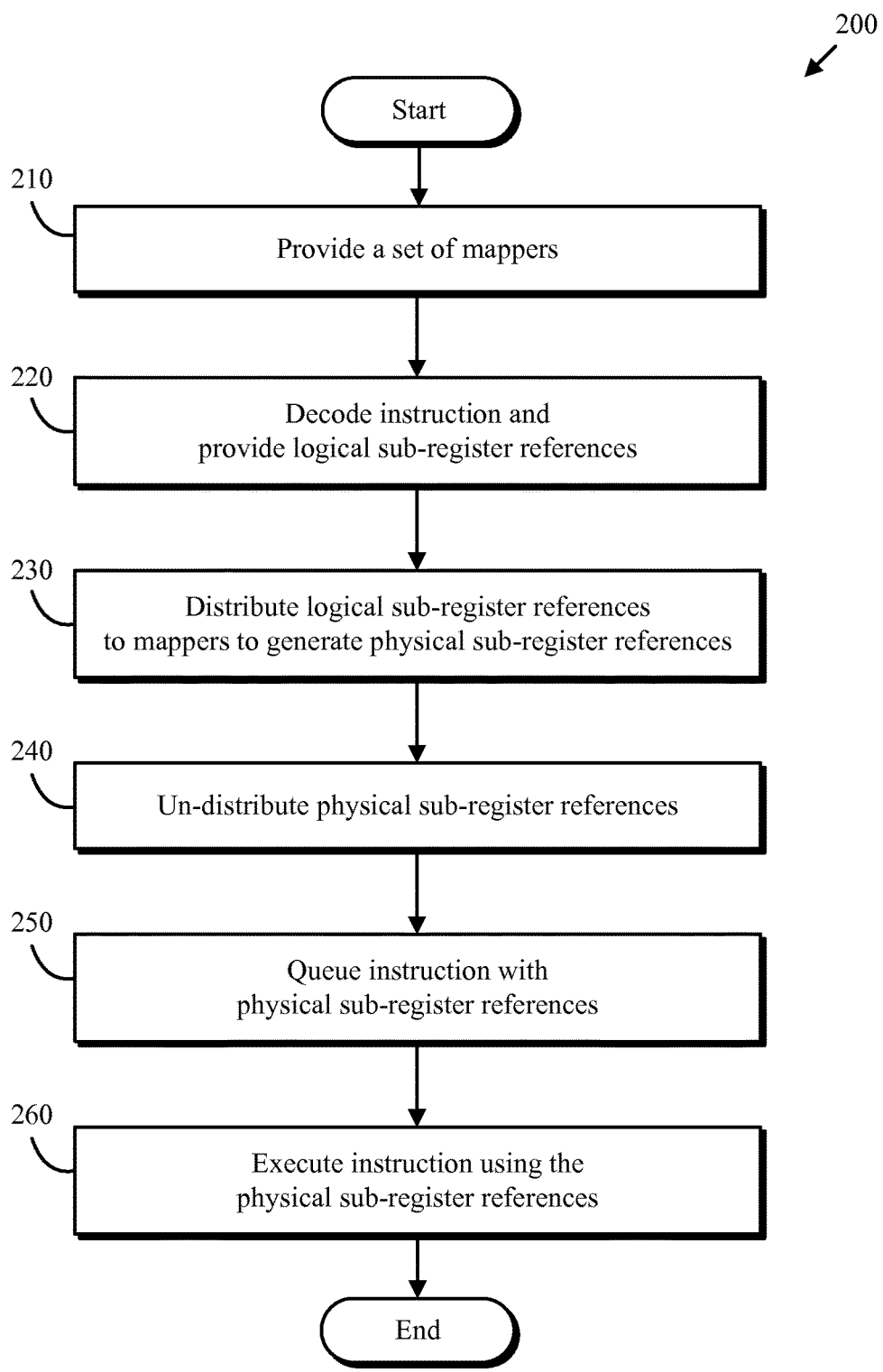
FIG. 2 is a flowchart depicting an instruction processing method in accordance with at least one embodiment of the present invention.

FIG. 2 is a flowchart depicting one embodiment of an instruction processing method 200 in accordance with at least one embodiment of the present invention. As depicted, the method includes providing (210) a set of mappers, decoding (220) an instruction, distributing (230) logical sub-register references to the mappers, un-distributing (240) the physical sub-register references, queuing (250) the instruction, and executing (260) the instruction. The instruction processing method 200 may be conducted with the instruction processing system 100 or the like.

Providing (210) a set of mappers may include providing mappers, such as the mappers 134, that map a logical sub-register reference to a physical sub-register reference. Decoding (220) an instruction may include extracting or generating a set of logical sub-register references that correspond to a logical register that is referenced in an instruction. For example, two 32-bit logical sub-register references may correspond to one 64-bit logical register reference.

Distributing (230) logical sub-register references to the mappers may include distributing the logical sub-register references in a manner that balances the load on the mappers. In response to receiving a logical sub-register reference, each mapper may provide a corresponding physical sub-register reference.

Un-distributing (240) the physical sub-register references may include reversing the distribution (i.e., ordering) that occurs in operation 230 in order to reorder the sub-register references and maintain a correspondence within the instruction processing system 100 between the sub-register references and the sub-register files that they are associated with. Queuing (250) the instruction may include placing the instruction in an issue queue along with the physical sub-register references generated by the mappers and reordered by operation 240. Executing (260) the instruction may include accessing the sub-register files 152 using the reordered physical sub-register references.

Figure 3:
FIG. 3 is a table showing the effect of one particular embodiment of the present invention on mapper utilization.

FIG. 3 is a table 300 showing the effect of one particular embodiment of the present invention on mapper utilization. As depicted, the table 300 includes a register type 310, an encoding 320, a flip bit state 330, a high mapper indicator 340 and a low mapper indicator 350. The depicted effect shown in table 300 is for a particular instruction set.

The register type 310 indicates the type of logical register that is being referenced by an instruction (e.g., instruction 112). The encoding 320 indicates the bit encoding within an instruction that corresponds to the register type used in the instruction. The depicted flip bit state 330 indicates the state of the bit that is used to determine the distribution of logical sub-register references to the mappers. The flip bit state 330 may be extracted from the instruction or may be the result of hashing multiple bits within the instruction. In the depicted embodiment, the flip bit state 330 corresponds to a selected low order bit in a selected sub-register reference encoded in the instruction. In some embodiments, instead of a single the flip bit state 330 a multi-bit pattern indicator (not shown) is extracted from, or hashed from, the instruction.

The high mapper indicator 340 indicates the mapper that is used for mapping the 'high word' sub-register references for the particular register type 310 (i.e., encoding 320) and flip bit state 330. Similarly, the low mapper indicator 350 indicates the mapper that is used for the 'low word' sub-register references. One of skill in the art will appreciate that mappers A and B are utilized for each register type.

Some of the embodiments disclosed herein mitigate mapper underutilization by changing the mappers that are responsible for upper word mappings and lower word mappings. Consequently, each of the mappers may be fully utilized. For example, if each mapper can contain 64 entries, each of the 64 entries can be utilized for each instruction type or mode. Furthermore, a portion of the instruction that typically varies substantially uniformly over time (e.g., selected low order bits from a logical sub-register reference) can be used to determine the distribution of logical sub-register references to the mappers. For example, instructions which reference an even logical register (i.e., 0, 2, 4, . . . , N−2, where N is the number of logical registers and mapper entries) may be processed with conventional mapping (e.g., sub-register references for high words are mapped by mapper 134A and sub-register references for low words are mapped by mapper 134B). In contrast, instructions which reference an odd logical register (i.e., 1, 3, 5, . . . , N−1) may be processed with a 'flipped' mapping (e.g., sub-register references for high words are mapped by mapper 134B and sub-register references for low words are mapped by mapper 134A). When particular instructions (e.g., particular register types) access only low words or high words, the above distribution scheme enables the mappers 134A and 134B to support 2N logical registers. Specifically, mapper 134A may support logical registers 0, 2, 4, ..., 2N−2 and mapper 134B may support logical registers 1, 3, 5, ..., 2N−1. The ability to support additional logical registers may be beneficial in multi-threaded and/or multi-processing systems.

It should be noted that the apparatuses disclosed herein may be integrated with additional circuitry within integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein. It should also be noted that, as used herein, the term "or" refers to every logical combination of two options. For example, the phrase "A or B" is essentially identical to the phrase "(A and not B) or (B and not A) or (A and B)".

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus comprising:
a mapping unit comprising a plurality of mappers wherein each mapper of the plurality of mappers maps logical sub-register references to corresponding physical sub-register references;
a decoding unit configured to receive an instruction and determine a plurality of logical sub-register references therefrom, wherein the plurality of logical sub-registers references are arranged in a sub-register order;
the mapping unit comprising a mapping distributor configured to distribute the plurality of logical sub-register references arranged in the sub-register order amongst the plurality of mappers according to at least one bit in the instruction and thereby provide a corresponding plurality of physical sub-register references arranged in a selected order;
the mapping unit further comprising a plurality of output multiplexers configured to un-distribute the plurality of physical sub-register references arranged in the selected order according to the at least one bit in the instruction and thereby provide the plurality physical sub-register references arranged in the sub-register order; and
an execution unit configured to execute the instruction using the plurality of physical sub-register references arranged in the sub-register order.

2. The apparatus of claim 1, wherein the execution unit comprises a plurality of physical sub-register files arranged in the sub-register order.

3. The apparatus of claim 1, wherein the decoding unit is configured to decode a portion of the instruction into a logical register type and a logical register number corresponding to the plurality of logical sub-registers references.

4. The apparatus of claim 3, wherein the mapping unit is configured to distribute the plurality of logical sub-register references amongst the plurality of mappers according to a hashing of one or more bits of the logical register type or the logical register number.

5. The apparatus of claim 4, wherein the hashing includes at least one bit within the logical register number.

6. The apparatus of claim 1, further comprising an issue queue configured to queue the plurality of physical sub-register references arranged in the sub-register order.

7. A method comprising:
providing a plurality of mappers wherein each mapper of the plurality of mappers maps logical sub-register references to physical sub-register references;
decoding an instruction and determining a plurality of logical sub-register references therefrom, wherein the plurality of logical sub-registers references are arranged in a sub-register order;
distributing the plurality of logical sub-register references amongst the plurality of mappers according to at least one bit in the instruction to provide a corresponding plurality of physical sub-register references arranged in a selected order;
un-distributing the plurality of physical sub-register references arranged in the selected order according to the at least one bit in the instruction to provide the plurality of physical sub-register references arranged in the sub-register order; and
executing the instruction using the plurality of physical sub-register references arranged in the sub-register order.

8. The method of claim 7, further comprising decoding a portion of the instruction into a logical register type and a logical register number corresponding to the plurality of logical sub-registers references and distributing the plurality of logical sub-register references amongst the plurality of mappers according to the logical register type or the logical register number.

9. The method of claim 8, further comprising distributing according to a hashing of one or more bits of the logical register type or the logical register number.

10. The method of claim 9, wherein the hashing includes at least one bit within the logical register number.

11. The method of claim 7, further comprising queuing the plurality of physical sub-register references arranged in the sub-register order.

12. The method of claim 7, further comprising caching the instruction.

13. A method comprising:
providing a mapping unit comprising a plurality of mappers wherein each mapper of the plurality of mappers maps logical sub-register references to corresponding physical sub-register references;
providing a decoding unit configured to receive an instruction and determine a plurality of logical sub-register references therefrom, wherein the plurality of logical sub-registers references are arranged in a sub-register order;
wherein the mapping unit comprises a mapping distributor configured to distribute the plurality of logical sub-register references arranged in the sub-register order amongst the plurality of mappers according to at least one bit in the instruction and thereby provide a corresponding plurality of physical sub-register references arranged in a selected order;
wherein the mapping unit further comprises a plurality of output multiplexers configured to un-distribute the plurality of physical sub-register references arranged in the selected order according to the at least one bit in the instruction and thereby provide the plurality of physical sub-register references arranged in the sub-register order;
providing an execution unit configured to execute the instruction using the plurality of physical sub-register references arranged in the sub-register order;
executing an instruction using the decoding unit, the mapping unit, and the execution unit.

14. The method of claim 13, wherein the execution unit comprises a plurality of physical sub-register files arranged in the sub-register order.

15. The method of claim 13, wherein the decoding unit is configured to decode a portion of the instruction into a logical register type and a logical register number corresponding to the plurality of logical sub-registers references.

16. The method of claim 15, wherein the mapping unit is configured to distribute the plurality of logical sub-register references amongst the plurality of mappers according to a hashing of one or more bits of the logical register type or the logical register number.

17. The method of claim 16, wherein the hashing includes at least one bit within the logical register number.

* * * * *